US010450106B2

(12) United States Patent
Namba

(10) Patent No.: US 10,450,106 B2
(45) Date of Patent: Oct. 22, 2019

(54) BAG WITH ZIPPER TAPE AND METHOD FOR PRODUCING SAME

(71) Applicant: IDEMITSU UNITECH CO., LTD., Tokyo (JP)

(72) Inventor: Yoshinori Namba, Chiba (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 13 days.

(21) Appl. No.: 15/563,071

(22) PCT Filed: Mar. 30, 2016

(86) PCT No.: PCT/JP2016/060505
§ 371 (c)(1),
(2) Date: Sep. 29, 2017

(87) PCT Pub. No.: WO2016/159148
PCT Pub. Date: Oct. 6, 2016

(65) Prior Publication Data
US 2018/0086508 A1    Mar. 29, 2018

(30) Foreign Application Priority Data

Mar. 31, 2015    (JP) .................................. 2015-074581

(51) Int. Cl.
*B65D 33/25*    (2006.01)
*B31B 70/64*    (2017.01)
(Continued)

(52) U.S. Cl.
CPC .......... *B65D 33/2541* (2013.01); *B31B 70/64* (2017.08); *B31B 70/8131* (2017.08);
(Continued)

(58) Field of Classification Search
CPC . B65D 33/2541; B31B 70/64; B31B 70/8131; B31B 2170/20; B31B 2160/10; B32B 27/08; B32B 27/32; B32B 2439/70
See application file for complete search history.

(56) References Cited

U.S. PATENT DOCUMENTS 6,092,931 A *    7/2000    Tilman .................. B29C 66/003
                                                          24/DIG. 50
7,077,570 B2 *    7/2006    Fukumori ................ B29D 5/10
                                                               24/585.12
(Continued)

FOREIGN PATENT DOCUMENTS

JP    2005-329150 A    12/2005
JP    2006-176196 A    7/2006
(Continued)

OTHER PUBLICATIONS

International Search Report dated Jun. 21, 2016 issued in corresponding PCT/JP2016/060505 application (2 pages).
(Continued)

*Primary Examiner* — Derek J Battisti
(74) *Attorney, Agent, or Firm* — Millen, White, Zelano & Branigan, PC

(57) ABSTRACT

A zipper tape includes a male belt-shaped base including a male base layer continuous with a male portion, and a female belt-shaped base including a female base layer continuous with a female portion. The male base layer and the female base layer are made of linear low-density polyethylene. A base film includes a sealant layer made of a resin containing polypropylene at 50 mass % or more with respect to the other resin component. A male seal layer and a female seal layer, which are bonded to the sealant layer, are made of a resin containing polyethylene at 50 mass % or more with respect to the other resin.

21 Claims, 9 Drawing Sheets

(51) Int. Cl.
   *B31B 70/81*   (2017.01)
   *B32B 27/08*   (2006.01)
   *B32B 27/32*   (2006.01)
   *B65D 30/08*   (2006.01)
   *B31B 170/20*   (2017.01)
   *B31B 160/10*   (2017.01)

(52) U.S. Cl.
   CPC .............. *B32B 27/08* (2013.01); *B32B 27/32* (2013.01); *B65D 31/04* (2013.01); *B65D 33/25* (2013.01); *B65D 33/2508* (2013.01); *B31B 2160/10* (2017.08); *B31B 2170/20* (2017.08); *B32B 2439/70* (2013.01)

(56) References Cited

U.S. PATENT DOCUMENTS

| | | | | |
|---|---|---|---|---|
| 7,736,058 B2* | 6/2010 | Tanaka | ............... | B65D 33/2541 24/585.12 |
| 7,886,412 B2* | 2/2011 | Dais | .................. | B65D 81/2023 24/399 |
| 8,066,434 B2 | 11/2011 | Nanba et al. | | |
| 2004/0091186 A1* | 5/2004 | Shibata | .............. | B65D 33/2508 383/210 |
| 2005/0210638 A1* | 9/2005 | Gradl | .................... | A44B 19/16 24/400 |
| 2005/0244083 A1* | 11/2005 | McMahon | ............ | B65D 33/20 383/63 |
| 2006/0111226 A1* | 5/2006 | Anzini | ............... | B65D 33/2508 493/214 |
| 2006/0292322 A1* | 12/2006 | Nakajima | ................. | B32B 3/06 428/35.2 |
| 2008/0031552 A1 | 2/2008 | Tanaka et al. | | |
| 2010/0236026 A1* | 9/2010 | Nanba | ................ | B65D 33/2575 24/30.5 L |

FOREIGN PATENT DOCUMENTS

| | | |
|---|---|---|
| JP | 2008-44663 A | 2/2008 |
| JP | 2014-113263 A | 6/2014 |
| JP | 2014-196145 A | 10/2014 |

OTHER PUBLICATIONS

English Abstract of JP 2006-176196 A published Jul. 6, 2006.
English Abstract of JP 2014-113263 A published Jun. 26, 2014.
English Abstract of JP 2014-196145 A published Oct. 16, 2014.
International Preliminary Report on Patentability dated Oct. 3, 2017 issued in corresponding PCT/JP2016/060505 application (6 pages).

* cited by examiner

BAG WITH ZIPPER TAPE AND METHOD FOR PRODUCING SAME

TECHNICAL FIELD

The present invention relates to a zipper-tape bag and a manufacturing method thereof.

BACKGROUND ART

There have been typically known various bags attached with a zipper tape that are used for packaging medicine, food and the like (see, for instance, Patent Literature 1).

Such a zipper-tape bag disclosed in patent Literature 1 includes a film forming a bag body and a zipper tape with a surface that is to be bonded to the film, the surface being provided with a predetermined resin layer so that the film and the zipper tape are easily bonded to each other.

A layered film including a seal layer made of a polypropylene resin containing polypropylene at 75 mass % or more with respect to the other resin component has been widely used for food packages.

A zipper tape may be bonded to such a layered film with the seal layer to make a zipper-tape bag. In such a case, a surface of the zipper tape to be bonded to the layered film may be provided with a layer made of a resin well-compatible with the seal layer of the layered film in order to improve a sealing performance at a bonding interface between the zipper tape and the layered film.

The polypropylene resin forming the seal layer of the layered film, however, has a higher melting point than a polyethylene resin. Thus, in sealing a peripheral portion of a bag body to make a bag, a certain amount of heat is necessary for crushing (i.e., point-sealing) parts of male member and female member of the zipper tape at a position located in the peripheral portion of the bag body along with the layered film.

Further, when crushed to make the bag, the resin forming the male member and the female member of the zipper tape spreads in the peripheral portion of the bag body. Accordingly, in order to ensure a sealing performance of the spreading resin in the peripheral portion of the bag body, a layer of the zipper tape that is not bonded to the layered film (i.e., a layer continuous with the male member and the female member) is also made of the same type of resin as that of the seal layer of the layered film.

CITATION LIST

Patent Literature(S)

Patent Literature 1 JP 2005-329150 A

SUMMARY OF THE INVENTION

Problem(s) to be Solved by the Invention

The inventor has vigorously studied and reached findings that allow for maintaining the sealing performance at the bonding interface between the film and the zipper tape.

An object of the invention is to provide a zipper-tape bag and a manufacturing method thereof that allow a film and a zipper tape to be well bonded to each other.

Means for Solving the Problem(s)

According to an aspect of the invention, a zipper-tape bag includes: a bag body including a layered film including at least two layers; and a zipper tape including: a male member including: a layered male belt-shaped base including at least two layers; and a male portion provided to the male belt-shaped base; and a female member including: a layered female belt-shaped base including at least two layers; and a female portion provided to the female belt-shaped base and engageable with the male portion, the male belt-shaped base of the male member and the female belt-shaped base of the female member being bonded to an inner surface of the bag body, in which the at least two layers of the film include a layer exposed on the inner surface of the bag body and made of a resin containing polypropylene at 50 mass % or more with respect to the other resin component, the male belt-shaped base and the female belt-shaped base each have a surface bonded to the inner surface of the bag body, the at least two layers of each of the male belt-shaped base and the female belt-shaped base include a first layer exposed on the bonded surface and made of a resin containing polyethylene at 50 mass % or more with respect to the other resin component, the at least two layers of the male belt-shaped base further include a layer continuous with the male portion, the at least two layers of the female belt-shaped base further include a second layer continuous with the female portion, and the second layer of each of the male belt-shaped base and the female belt-shaped base is made of linear low-density polyethylene.

In the above aspect, the belt-shaped bases of the zipper tape each include the linear low-density polyethylene layer continuous with the male portion or the female portion. Such a layer allows for maintaining a sealing performance at a bonding interface in a peripheral portion of the bag body between the spreading resin (linear low-density polyethylene) of the crushed male portion and female portion of the zipper tape and the resin (consisting mainly of polypropylene) of the layer exposed on the inner surface of the bag body.

According to another aspect of the invention, a zipper-tape bag includes: a bag body including a layered film including at least two layers; and a zipper tape including: a male member including: a layered male belt-shaped base including at least two layers; and a male portion provided to the male belt-shaped base; and a female member including: a layered female belt-shaped base including at least two layers; and a female portion provided to the female belt-shaped base and engageable with the male portion, one of the male belt-shaped base and the female belt-shaped base being elongated toward a side in a width direction to have a width longer than a width of the other of the male belt-shaped base and the female belt-shaped base when the male portion and the female portion are engaged with each other, in which the other of the male belt-shaped base and the female belt-shaped base, which is not elongated, has a first surface provided with the male portion or the female portion and a second surface opposite to the first surface and bonded to an inner surface of the bag body, and the elongated one of the male belt-shaped base and the female belt-shaped base has an elongated area having a surface bonded to the inner surface of the bag body at a side where the male portion or the female portion projects, the at least two layers of the film include a layer exposed on the inner surface of the bag body and made of a resin containing polypropylene at 50 mass % or more with respect to the other resin component, the at least two layers of the other of the male belt-shaped base and the female belt-shaped base, which is not elongated, include a first layer exposed on the second surface, the at least two layers of the elongated one of the male belt-shaped base and the female belt-shaped base include a first layer exposed on the surface of the elongated area at the side where the male portion or the female portion projects, the first layer of each of the male belt-shaped base and the female belt-shaped base is made of a resin containing polyethylene at 50 mass % or more with respect to the other resin component, the at least two layers of the male belt-shaped base further include a layer continuous with the male portion, the at least two layers of the female belt-shaped base further include a second layer continuous with the female portion, and the second layer of each of the male belt-shaped base and the female belt-shaped base is made of linear low-density polyethylene.

In the above aspect, the belt-shaped bases of the zipper tape each include the linear low-density polyethylene layer continuous with the male portion or the female portion. Such a layer, which is made of polyethylene unlike the polypropylene resin layer exposed on the inner surface of the bag body, allows for maintaining a sealing performance at a bonding interface in a peripheral portion of the bag body between the spreading resin (linear low-density polyethylene) of a crushed portion of the male portion and the female portion of the zipper tape and the resin (consisting mainly of polypropylene) of the layer exposed on the inner surface of the bag body irrespective of a difference of the resin materials. In particular, such a layer also allows for maintaining the sealing performance at the bonding interface when the other of the male belt-shaped base and the female belt-shaped base, which is not elongated, has the first surface provided with the male portion or the female portion and the second surface opposite to the first surface and bonded to the inner surface of the bag body, and the elongated one of the male belt-shaped base and the female belt-shaped base has the elongated area having the surface bonded to the inner surface of the bag body at the side where the male portion or the female portion projects.

In the above aspect, it is preferable that the at least two layers of the elongated one of the male belt-shaped base and the female belt-shaped base further include a third layer provided to the second surface, the third layer being made of a resin containing polyethylene at 50 mass % or more with respect to the other resin component.

In the above arrangement, the third layer, which is made of the resin containing polyethylene at 50 mass % or more with respect to the other resin component, allows for improving a sealing strength for a film of cast polypropylene (CPP) or the like.

In the above aspect, it is preferable that a density of the linear low-density polyethylene ranges from 905 kg/m$^3$ to 940 kg/m$^3$.

When the linear low-density polyethylene has such a predetermined density, the sealing performance can be ensured at the interface between the linear low-density polyethylene and the polypropylene resin, which forms the film of the bag body. If the density of the linear low-density polyethylene is less than 905 kg/m$^3$, the linear low-density polyethylene becomes more adhesive to a resin consisting mainly of polypropylene (i.e., polypropylene resin) but, on the other hand, would become excessively softened, failing to achieve a sufficient engagement strength of the male portion and the female portion. If the density is 905 kg/m$^3$ or more, the linear low-density polyethylene has been believed to fail to function as, for instance, a heat-seal layer bonded to the film due to a lowered adhesiveness to polypropylene resins and, consequently, fail to ensure the sealing performance at the interface against the polypropylene resin. Accordingly, the linear low-density polyethylene with a density of 905 kg/m$^3$ or more has been believed to be unusable to make the layer continuous with the male portion or the female portion of each of the belt-shaped bases of the zipper tape, which is intended to be used for the zipper-tape bag including the layer that is made of the resin consisting mainly of polypropylene and exposed on the inner surface of the bag body. However, the inventor has found through a vigorous study that no pinhole is made at the interface between the linear low-density polyethylene and the polypropylene resin layer, when the zipper tape, which is used for the zipper-tape bag including the polypropylene resin layer exposed on the inner surface of the bag body, includes the layer that is continuous with each of the male portion and the female portion of the belt-shaped bases and made of the linear low-density polyethylene with a density of 905 kg/m$^3$ in order to achieve the sufficient engagement strength of the male portion and the female portion. Further, if the density of the linear low-density polyethylene exceeds 940 kg/m$^3$, the linear low-density polyethylene would fail to adhere to polypropylene resins.

In the above aspect, it is preferable that the bag body is formed into a bag-shape by folding a single sheet of the film and bonding a doubled periphery of the film, and the periphery of the bag body is provided with a bonding portion where the film is bonded to itself with a longitudinal end of the zipper tape being sandwiched in the film.

In the above arrangement, the bag body is formed from a single sheet of the film and provided with the bonding portion where the film is bonded to itself with the longitudinal end of the zipper tape being sandwiched in the film, thereby eliminating the necessity of cutting the film to improve production efficiency.

In the above aspect, it is preferable that the bag body is formed into a bag-shape by laying at least two sheets of the film on each other and bonding a doubled periphery of the film, and the periphery of the bag body is provided with a pair of bonding portions where the sheets of the film are bonded to each other with a longitudinal end of the zipper tape being sandwiched therebetween.

In the above arrangement, the bag body is formed from at least two sheets of the film and provided with the pair of bonding portions where the sheets of the film are bonded to each other with the longitudinal end of the zipper tape being sandwiched therebetween. Such an arrangement enables manufacturing a structurally complicated zipper-tape bag.

According to still another aspect of the invention, a manufacturing method of a zipper-tape bag, the zipper-tape bag including: a bag body including a layered film including at least two layers; and a zipper tape including: a male member including: a layered male belt-shaped base including at least two layers; and a male portion provided to the male belt-shaped base; and a female member including: a layered female belt-shaped base including at least two layers; and a female portion provided to the female belt-shaped base and engageable with the male portion, the male belt-shaped base of the male member and the female belt-shaped base of the female member being bonded to an inner surface of the bag body, in which the at least two layers of the film include a layer exposed on the inner surface of the bag body and made of a resin containing polypropylene at 50 mass % or more with respect to the other resin component, the male belt-shaped base and the female belt-shaped base each have a surface bonded to the inner surface of the bag body, the at least two layers of each of the male belt-shaped base and the female belt-shaped base include a first layer exposed on the bonded surface and made of a resin containing polyethylene at 50 mass % or more with respect to the other resin component, the at least two layers of the male belt-shaped base further include a layer continuous with the male portion, and the at least two layers of the female belt-shaped base further include a second layer continuous with the female portion, the second layer of each of the male belt-shaped base and the female belt-shaped base being made of linear low-density polyethylene, the method includes: bonding the male belt-shaped base and the female belt-shaped base to the film; and forming the film into a bag-shape by bonding a periphery of the film where the male belt-shaped base and the female belt-shaped base are bonded.

In the above aspect, the belt-shaped bases of the zipper tape each include the linear low-density polyethylene layer continuous with the male portion or the female portion. Such a layer, which is made of polyethylene unlike the polypropylene resin layer exposed on the inner surface of the bag body, allows for manufacturing a zipper-tape bag kept sealed at a bonding interface in a peripheral portion of the bag body between the spreading resin of the crushed male portion and female portion of the zipper tape and the inner surface of the bag body irrespective of a difference of the resin materials. Further, the male portion and the female portion are crushed, if necessary to make the bag, with a reduced thermal energy. The bag body may be made by peripherally sticking two sheets of the film on each other or sticking the periphery of the folded single film. In such a bag-making method, the male portion and the female portion of the zipper tape are usually crushed at the peripheral portion of the bag body. The bag-making method is thus especially suitable for manufacturing the zipper-tape bag kept sealed at the peripheral portion of the bag body.

According to yet another aspect of the invention, a manufacturing method of a zipper-tape bag, the zipper-tape bag including: a bag body including a layered film including at least two layers; and a zipper tape including: a male member including: a layered male belt-shaped base including at least two layers; and a male portion provided to the male belt-shaped base; and a female member including: a layered female belt-shaped base including at least two layers; and a female portion provided to the female belt-shaped base and engageable with the male portion, one of the male belt-shaped base and the female belt-shaped base being elongated toward a side in a width direction to have a width longer than a width of the other of the male belt-shaped base and the female belt-shaped base when the male portion and the female portion are engaged with each other, in which the other of the male belt-shaped base and the female belt-shaped base, which is not elongated, has a first surface provided with the male portion or the female portion and a second surface opposite to the first surface and bonded to an inner surface of the bag body, and the elongated one of the male belt-shaped base and the female belt-shaped base has an elongated area having a surface bonded to the inner surface of the bag body at a side where the male portion or the female portion projects, the at least two layers of the film include a layer exposed on the inner surface of the bag body and made of a resin containing polypropylene at 50 mass % or more with respect to the other resin component, the at least two layers of the other of the male belt-shaped base and the female belt-shaped base, which is not elongated, include a first layer exposed on the second surface, the at least two layers of the elongated one of the male belt-shaped base and the female belt-shaped base include a first layer exposed on the surface of the elongated area at a side where the male portion or the female portion projects, the first layer of each of the male belt-shaped base and the female belt-shaped base is made of a resin containing polyethylene at 50 mass % or more with respect to the other resin component, the at least two layers of the male belt-shaped base further include a layer continuous with the male portion, the at least two layers of the female belt-shaped base further include a second layer continuous with the female portion, and the second layer of each of the male belt-shaped base and the female belt-shaped base is made of linear low-density polyethylene, the method includes: bonding the male belt-shaped base and the female belt-shaped base to the film; and forming the film into a bag-shape by bonding a periphery of the film where the male belt-shaped base and the female belt-shaped base are bonded.

In the above aspect, the belt-shaped bases of the zipper tape each include the linear low-density polyethylene layer continuous with the male portion or the female portion. Such a layer, which is made of polyethylene unlike the polypropylene resin layer exposed on the inner surface of the bag body, allows for maintaining a sealing performance at a bonding interface in a peripheral portion of the bag body between the spreading resin of the crushed male portion and female portion of the zipper tape and the inner surface of the bag body irrespective of a difference of the resin materials. Further, the male portion and the female portion are crushed, if necessary to make the bag, with a reduced thermal energy. The bag body may be made by peripherally sticking two sheets of the film on each other or sticking the periphery of the folded single film. In such a bag-making method, the male portion and the female portion of the zipper tape are usually crushed at the peripheral portion of the bag body. The bag-making method is thus especially suitable for manufacturing the zipper-tape bag kept sealed at the peripheral portion of the bag body. Especially, the bag-making method allows for easily manufacturing a zipper-tape bag in which the other of the male belt-shaped base and the female belt-shaped base, which is not elongated, has a first surface provided with the male portion or the female portion and a second surface opposite to the first surface and bonded to an inner surface of the bag body, and the elongated one of the male belt-shaped base and the female belt-shaped base has an elongated area having a surface bonded to the inner surface of the bag body at a side where the male portion or the female portion projects.

In the above aspect, it is preferable that the at least two layers of the elongated one of the male belt-shaped base and the female belt-shaped base further include a third layer provided to the second surface, the third layer being made of a resin containing polyethylene at 50 mass % or more with respect to the other resin component.

In the above arrangement, the elongated one of the male belt-shaped base and the female belt-shaped base further includes the third layer, which is made of the resin containing polyethylene at 50 mass % or more with respect to the other resin component, provided to the second surface opposite to the first surface provided with the male member or the female member. Such an arrangement allows for easily manufacturing a zipper-tape bag with an improved sealing strength for a CPP film or the like.

In the above aspect, it is preferable that a density of the linear low-density polyethylene ranges from 905 $kg/m^3$ to 940 $kg/m^3$.

When the linear low-density polyethylene has such a predetermined density, a zipper-tape bag can be easily manufactured with the sealing performance being ensured at the interface between the linear low-density polyethylene and the polypropylene resin film of the bag body.

In the above aspect, it is preferable that the formation of the film into the bag-shape includes folding a single sheet of the film, and bonding a doubled periphery of the film with a longitudinal end of the zipper tape being sandwiched in the film.

In the above arrangement, the bag body is formed from a single sheet of the film and provided with the bonding portion where the film is bonded to itself with the longitudinal end of the zipper tape being sandwiched in the film, thereby eliminating the necessity of cutting the film to improve production efficiency.

In the above aspect of the invention, the formation of the film into the bag-shape includes laying at least two sheets of the film on each other, bonding a doubled periphery of the film, and forming a pair of bonding portions where the sheets of the film are bonded to each other with a longitudinal end of the zipper tape being sandwiched therebetween.

In the above arrangement, the bag body is formed from at least two sheets of the film and provided with the pair of bonding portions where the sheets of the film are bonded to each other with the longitudinal end of the zipper tape being sandwiched therebetween. Such an arrangement serves to make a structurally complicated zipper-tape bag.

BRIEF DESCRIPTION OF DRAWING(S)

DESCRIPTION OF EMBODIMENT(S)

Exemplary embodiment(s) of the invention will be described below with reference to the attached drawings.

In the description of the embodiment(s), the explanation of components with the same reference signs will be simplified or omitted.

It should be noted that, though a zipper-tape bag in the exemplary embodiment(s) is exemplarily provided in a form of a bag for packaging various articles including food, medicine, medical products, stationeries, and miscellaneous goods, these examples of the articles to be packaged are not exhaustive.

First Exemplary Embodiment
Structure of Zipper-Tape Bag

Figure 1:
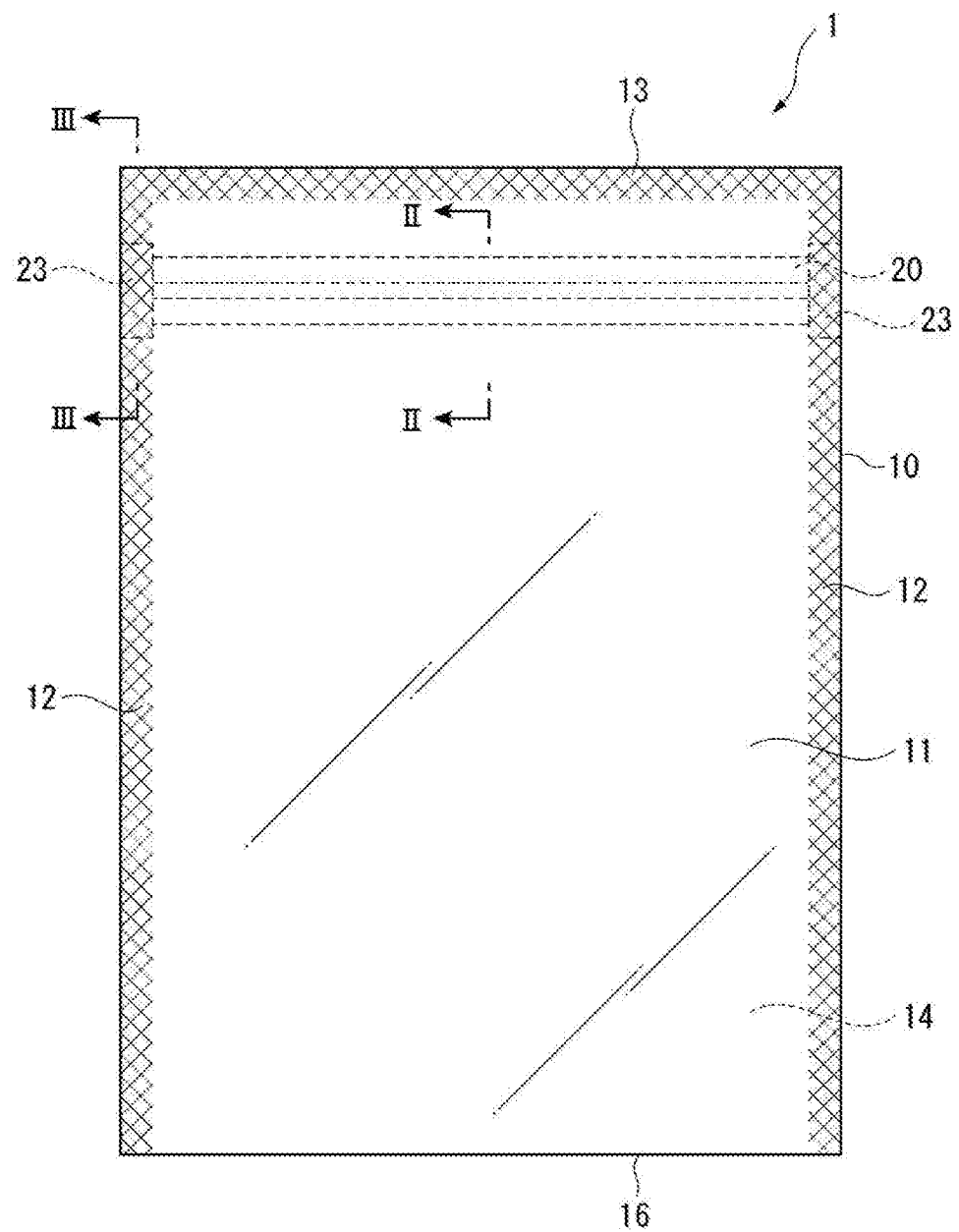
FIG. 1 is a plan view showing a zipper-tape bag according to a first exemplary embodiment of the invention.

As shown in FIG. 1, a zipper-tape bag 1 includes a bag body 10, and a zipper tape 20 bonded (for instance, heat-sealed) to an inner surface of the bag body 10.

Structure of Bag Body

The bag body 10 is made by laying two sheets of a base film 11 (i.e., a film) on each other and providing a pair of side seals 12 (i.e., a bonding portion) and top seal 13 to a doubled periphery of the base film 11.

Incidentally, instead of being made of the two sheets of the base film 11, the bag body 10 may be made by folding a single sheet of base film and bonding peripheral portions laid on each other in any one of various bag-making methods such as a three-sided-bag making method, a four-sided-bag making method, pillow-type-bag making method and a rotary-drum bag-making method.

The bag body 10, to which the zipper tape 20 is attached along the top seal 13, has a containing space 14 for containing a content defined at an inside where the zipper tape 20 is attached. When the top seal 13 is cut off, the bag body 10 has a free edge, which is identical to an edge of an opening (not shown) reclosable using the zipper tape 20. Incidentally, the bag body 10 has a bottom seal (not shown), which is sealed after a content is put in the bag body 10 through an input opening 16 opened downward.

The base film 11 may be made of a thermoplastic resin film having a two-layered structure. The base film 11 includes an exterior base layer 11A exposed on an outer surface of the bag body 10, and a sealant layer 11B layered on the exterior base layer 11A and exposed on an inner surface of the bag body 10.

For instance, biaxially-oriented polypropylene (OPP), biaxially-oriented polyethylene terephthalate (OPET) or biaxially-oriented nylon (ONy) is usable to form the exterior base layer 11A of the base film 11.

Further, a polypropylene resin containing polypropylene at 50 mass % or more with respect to the other resin component, preferably 85 mass %, more preferably 95 mass % or more is usable to form the sealant layer 11B of the base film 11.

Incidentally, the upper limit of the content of polypropylene is not limited but has to be less than 100 mass %. Examples of the resin include linear low-density polyethylene (LLDPE), low-density polyethylene, and polybutene.

When the content of polypropylene is less than 50 mass %, the strength of the base film 11 is not sufficient as a film of cast polypropylene (CPP). Accordingly, polypropylene is contained at 50 mass % or more.

Incidentally, the exterior base layer 11A and the sealant layer 11B may be added with an additive such as a slipping agent, an anti-blocking agent, an antioxidant and a pigment as needed.

Further, instead of the two-layered structure, the base film 11 may have a multi-layered structure including three or more various films, in which, for instance, aluminum is deposited or aluminum foil is layered for the purpose of gas barrier or light shielding.

Though any packaging bag material may be used as the base film 11, the base film 11 preferably has a thickness, for instance, in a range from 10 μm to 200 μm.

When the thickness is less than 10 μm, sealing strength and bag strength may sometimes be weakened. In contrast, when the thickness exceeds 200 μm, the bag may sometimes be difficult to open.

Structure of Zipper Tape

Figure 2:
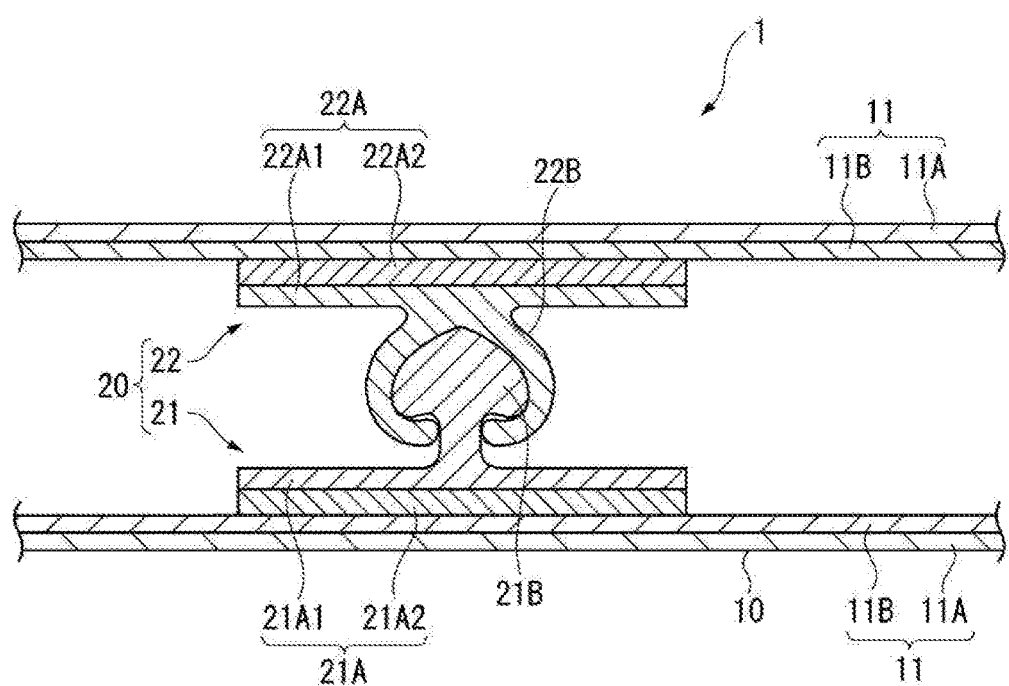
FIG. 2 is a cross-sectional view taken along a line II-II in FIG. 1.

As shown in FIG. 2, the zipper tape 20 includes a male member 21 and a female member 22. The zipper tape 20 is attached to the bag body 10 along an opening of the bag body 10, namely, an edge of the base film 11 provided with the top seal 13.

The male member 21 includes a longitudinal male belt-shaped base 21A, and a projecting male portion 21B with a substantially arrow-shaped cross section that is provided to the male belt-shaped base 21A along a longitudinal direction.

The male belt-shaped base 21A includes a male base layer 21A1 (second layer) continuous with the male portion 21B, and a male seal layer 21A2 (first layer) layered on a surface of the male base layer 21A1 opposite to the side where the male portion 21B projects, the male seal layer 21A2 being bonded to the sealant layer 11B of the bag body 10.

Similarly to the male member 21, the female member 22 includes a longitudinal female belt-shaped base 22A, and a projecting female portion 22B with a recessed cross section that is provided to the female belt-shaped base 22A along a longitudinal direction and engageable with the male portion 21B.

The female belt-shaped base 22A includes a female base layer 22A1 (second layer) continuous with the female portion 22B, and a female seal layer 22A2 (first layer) layered on a surface of the female base layer 22A1 opposite to the side where the female portion 22B projects, the female seal layer 22A2 being bonded to the sealant layer 11B of the bag body 10.

A resin for forming the male base layer 21A1 and the female base layer 22A1 of the zipper tape 20 may be linear low-density polyethylene.

Examples of the linear low-density polyethylene include metallocene-catalyzed synthetic polyethylene and Ziegler-Natta-catalyzed synthetic polyethylene, which are not exhaustive.

The density of the linear low-density polyethylene preferably ranges from 905 kg/m$^3$ to 940 kg/m$^3$, particularly preferably from 910 kg/m$^3$ to 925 kg/m$^3$.

If the density is less than 905 kg/m$^3$, the linear low-density polyethylene becomes more adhesive to a polypropylene resin but, on the other hand, would become excessively softened, failing to achieve a sufficient engagement strength of the male portion 21B and the female portion 22B of the zipper tape 20. If the density is 905 kg/m$^3$ or more, the linear low-density polyethylene has been believed to fail to function as, for instance, a heat-seal layer bonded to the base film 11 due to a lowered adhesiveness to polypropylene resins, and, consequently, fail to ensure a sealing performance at an interface against the sealant layer 11B made of a polypropylene resin. Accordingly, the linear low-density polyethylene with a density of 905 kg/m$^3$ or more has been believed to be unusable to make the male base layer 21A1 and the female base layer 22A1 respectively continuous with the male portion 21B and the female portion 22B of the male belt-shaped base 21A and the female belt-shaped base 22A of the zipper tape 20, which is intended to be used for the zipper-tape bag 1 including the sealant layer 11B that is made of a polypropylene resin and exposed on the inner surface of the bag body 10.

However, the inventor has found through a vigorous study that no pinhole is made at the interface between the linear low-density polyethylene and the polypropylene-resin sealant layer 11B, when the zipper tape 20, which is attached to the zipper-tape bag 1 including the sealant layer 11B of the polypropylene resin exposed on the inner surface of the bag body 10, includes the male base layer 21A1 and the female base layer 22A1 that are respectively continuous with the male portion 21B and the female portion 22B of the male belt-shaped base 21A and the female belt-shaped base 22A and made of the linear low-density polyethylene with a density of 905 kg/m$^3$ in order to achieve the sufficient engagement strength of the male portion 21B and the female portion 22B.

Further, if the density of the linear low-density polyethylene exceeds 940 kg/m$^3$, the linear low-density polyethylene would fail to adhere to polypropylene.

Incidentally, the density is measured in any one of the methods according to JIS K 7112.

In contrast, the male seal layer 21A2 and the female seal layer 22A2 of the zipper tape 20 are made of a resin that is well compatible and mixable not only with a resin used to make the male base layer 21A1 and the female base layer 22A1 but also with the sealant layer 11B of the bag body 10.

Specifically, such a resin may be a polyethylene resin containing polyethylene at 50 mass % or more with respect to the other resin component, preferably 65 mass % or more, further preferably 75 mass % or more. Examples of the polyethylene include low-density polyethylene (LDPE), linear low-density polyethylene and metallocene linear low-density polyethylene, among which the metallocene linear low-density polyethylene is preferable in terms of improvement in a sealing strength for CPP. The polyethylene resin may contain a copolymer consisting mainly of ethylene such as ethylene-vinyl acetate copolymer (EVA) and ethylene-methacrylate copolymer (EMAA).

Incidentally, the upper limit of the content of polyethylene is not limited but has to be less than 100 mass %, particularly preferably 90 mass % or less. Examples of the other resin component include polypropylene (PP) and polybutene-1.

The zipper tape 20 is made by integrally co-extruding the male base and seal layers 21A1, 21A2 and the female base and seal layers 22A1, 22A2 to form the male member 21 and the female member 22.

The thus-obtained zipper tape 20 is placed at a predetermined position on the base film 11 using, for instance, a three-side seal bag-making machine to make the zipper-tape bag 1. Subsequently, the zipper tape 20 is subjected to a crushing process (i.e., so-called point-sealing) at a predetermined interval, namely, an interval between the side seals 12 of the bag body 10. Specifically, at least one of the male portion 21B or the female portion 22B is crushed along with the base film 11 using a heated jig to form a crushed portion 23.

The zipper tape 20 with the crushed portion 23 is bonded to the base film 11, and the base film 11 is formed into a bag-shape by forming the top seal 13 and forming each of the side seals 12 at a position corresponding to the crushed portion 23. The zipper-tape bag 1 is thus manufactured.

Figure 3:
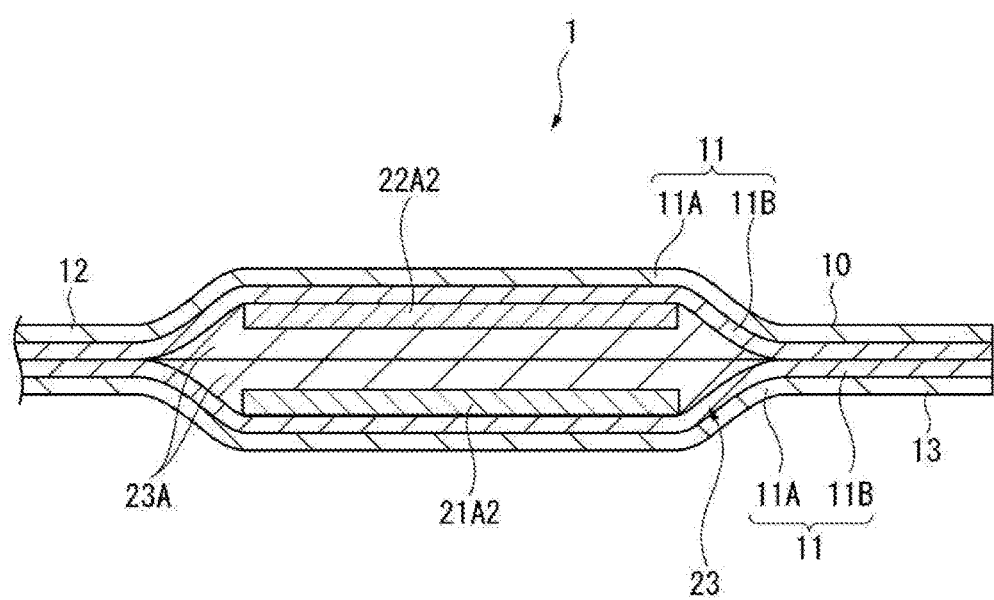
FIG. 3 is a cross-sectional view taken along a line III-III in FIG. 1.

As shown in FIG. 3, in the crushed portion 23 corresponding to each of the side seals 12 of the manufactured zipper-tape bag 1, the male member 21, namely, the male portion 21B and the male base layer 21A1 of the male belt-shaped base 21A, and the female member 22, namely, the female portion 22B and the female base layer 22A1 of the female belt-shaped base 22A, are melted and crushed to spread. Such a spreading part 23A is bonded to the base film 11. The spreading part 23A, which is made of the linear low-density polyethylene and melted, is favorably in close contact with the base film 11 at a bonding interface therebetween.

Advantage(s) of First Exemplary Embodiment

The zipper tape 20 of the first exemplary embodiment includes the male belt-shaped base 21A including the male base layer 21A1 continuous with the male portion 21B, and the female belt-shaped base 22A including the female base layer 22A1 continuous with the female portion 22B, the male base layer 21A1 and the female base layer 22A1 being made of the linear low-density polyethylene, as described above.

Although the male base layer 21A1 and the female base layer 22A1 are made of polyethylene, which is a different material from the polypropylene resin for forming the sealant layer 11B exposed on the inner surface, the zipper tape bag 1 can be kept sufficiently sealed at the bonding interface between the spreading resin of the male portion 21B and the female portion 22B, which are crushed at a position corresponding to each of the side seals 12, and the inner surface of the bag body 10 irrespective of a difference of the resin materials.

Additionally, the resin forming the male portion 21B and the female portion 22B is the linear low-density polyethylene, so that the male portion 21B and the female portion 22B can be efficiently crushed with a reduced thermal energy to make the bag.

The bag body 10 may be made by peripherally sticking two sheets of the base film 11 on each other or sticking the periphery of the folded single sheet of the base film 11. In such a bag-making method, the male portion 21B and the female portion 22B of the zipper tape 20 are usually crushed at the peripheral portion of the bag body 10.

The bag-making method is thus especially suitable for manufacturing the zipper-tape bag 1 kept sealed at the side seals 12, in which the ends of the zipper tape 20 are located, provided to the peripheral portion of the bag body 10.

Second Exemplary Embodiment

Next, a second exemplary embodiment of the invention will be described with reference to the attached drawings.

Figure 4:
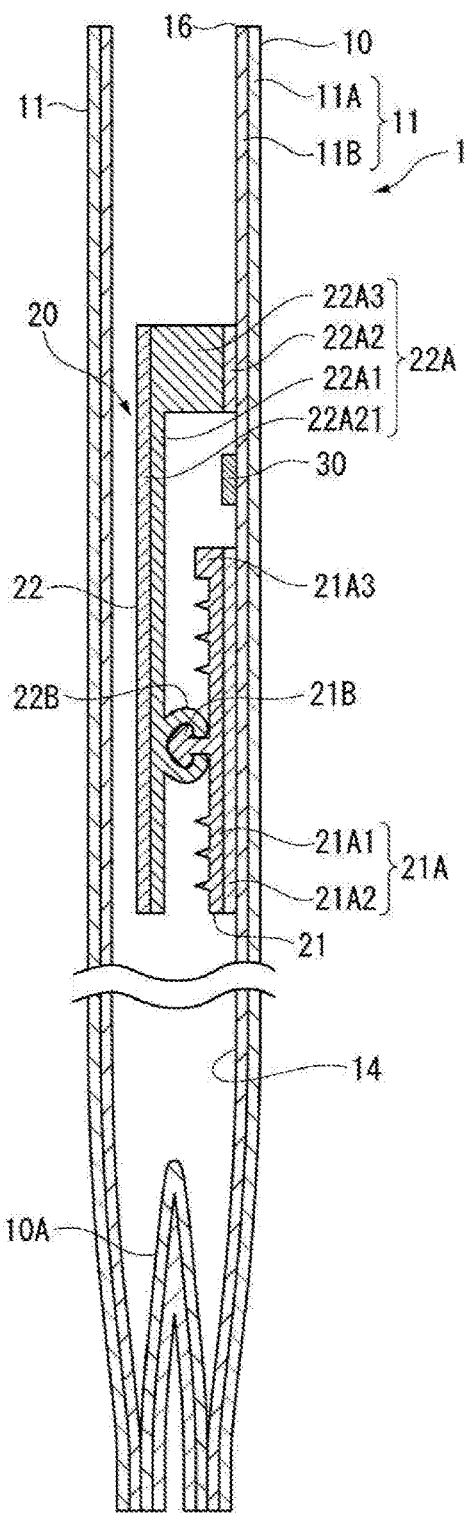
FIG. 4 is a cross-sectional view showing a zipper-tape bag according to a second exemplary embodiment of the invention.

FIG. 4 is a cross-sectional view showing a zipper-tape bag according to the second exemplary embodiment.

The zipper-tape bag 1 according to the second exemplary embodiment is provided with a member for opening, whereas the zipper-tape bag 1 according to the first exemplary embodiment is opened by cutting off the top seal 13.

As shown in FIG. 4, the zipper-tape bag 1 includes the bag body 10 having a bottom provided with a gusset 10A, the zipper tape 20 bonded (for instance, heat-sealed) to the inner surface of the bag body 10, and a belt-shaped separation ridge 30 bonded to the inner surface of the bag body 10. Incidentally, the separation ridge 30 may be in any shape other than the belt shape, such as a string shape, allowing for tearing the bag body 10 to be opened.

The zipper tape 20 includes the male member 21 including the male belt-shaped base 21A and the male portion 21B, and the female member 22 including the female belt-shaped base 22A and the female portion 22B.

In the zipper tape 20, the female belt-shaped base 22A is elongated or widened toward the top seal 13 of the bag body 10 (i.e., a side in a width direction) to have a width longer than a width of the male belt-shaped base 21A with the male portion 21B and the female portion 22B being engaged with each other.

The male belt-shaped base 21A has a two-layered structure including the male base layer 21A1 and the male seal layer 21A2. A side of the male base layer 21A1 in the width direction is provided with a male thickened area 21A3 thicker than the male base layer 21A1.

The female belt-shaped base 22A has a multi-layered structure including the female base layer 22A1 provided with a female thickened area 22A3 at a side in the width direction, the female seal layer 22A2 layered on a surface of the female thickened area 22A3 where the female portion 22B projects, and a second female seal layer 22A21 layered on a surface of the female base layer 22A1 opposite to a surface where the female portion 22B projects. Incidentally, the female seal layer 22A2 and the second female seal layer 22A21 may be the same or different in composition.

In the zipper tape 20, the male seal layer 21A2 of the male belt-shaped base 21A is bonded to the inner surface of the bag body 10, and the female seal layer 22A2 of the female belt-shaped base 22A is bonded to the inner surface of the bag body 10 adjacently to the area where the male belt-shaped base 21A is bonded.

In the zipper-tape bag 1, the separation ridge 30 is attached between the area where the male belt-shaped base 21A is bonded and the area where the female belt-shaped base 22A is bonded.

Incidentally, after a content is put in the bag body 10 through the upwardly opened input opening 16, the bag body 10 is closed by forming a top seal (not shown) to make the zipper-tape bag 1.

Further, the zipper-tape bag 1 is opened by tearing the bag body 10 from an end of the separation ridge 30 in a longitudinal direction. Edges formed by tearing and opening the zipper-tape bag 1 are pinched with fingers to disengage the male portion 21B and the female portion 22B from each other. At this time, the fingers are caught at the male thickened area 21A3 and the female thickened area 22A3, so that the zipper-tape bag 1 can be easily opened.

Advantage(s) of Second Exemplary Embodiment

In the second exemplary embodiment, the male base layer 21A1 and the female base layer 22A1 have the same resin composition as that of the first exemplary embodiment, and the male seal layer 21A2 and the female seal layer 22A2, which are bonded to the sealant layer 11B of the bag body 10, have the same resin composition as that of the first exemplary embodiment. The zipper-tape bag 1 can thus be kept sufficiently sealed at the bonding interface between the spreading resin of the male portion 21B and the female portion 22B, which are crushed at the position corresponding to each of the side seals 12, and the inner surface of the bag body 10 in the same manner as in the first exemplary embodiment. In particular, the second female seal layer 22A21 serves to prevent a problem such as generation of a pinhole at the position corresponding to each of the side seals 12.

Further, the male portion 21B and the female portion 22B can be efficiently crushed, if necessary to make the bag, with a reduced thermal energy.

Modification(s)

It should be noted that, though the best arrangement and the like for implementing the invention are disclosed in the above, the scope of the invention is not limited thereto. In other words, while the invention has been particularly explained mainly in relation to a specific embodiment, a person skilled in the art could make various modifications in terms of material, quantity or other particulars to the above described embodiment without deviating from the technical idea or any object of the present invention.

Accordingly, any descriptions of the material or layer arrangement or the like disclosed above are given as examples to enable easy understanding of the invention, and do not limit the invention, so that descriptions using names of components, with any such limitations of the material or the like removed in part or whole, are included in the invention.

Figure 5:
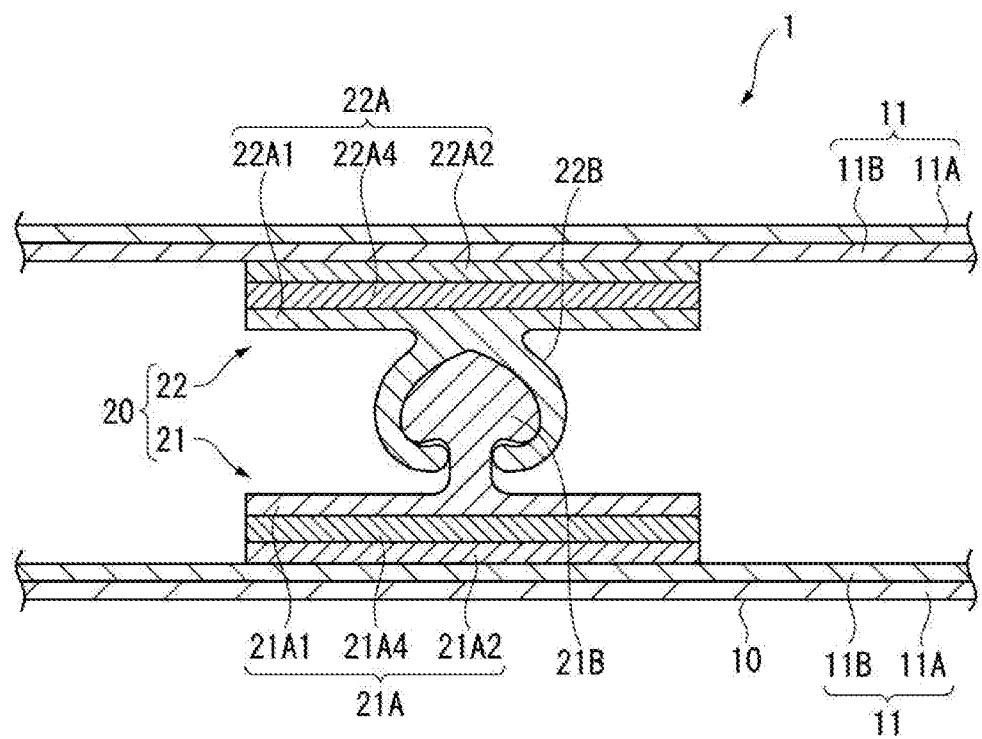
FIG. 5 is a cross-sectional view showing a zipper-tape bag according to another exemplary embodiment of the invention.

For instance, although the male belt-shaped base 21A and the female belt-shaped base 22A of the first exemplary embodiment each have the two-layered structure, these components may each have, for instance, a three-layered structure further including a male intermediate layer 21A4 or a female intermediate layer 22A4 as shown in FIG. 5 or, alternatively, may each have a layered structure including four or more layers.

Likewise, the base film 11 may have a layered structure including three or more layers instead of the two-layered structure.

The female belt-shaped base 22A of the second exemplary embodiment is widened but, alternatively, the male belt-shaped base 21A may be widened.

Figure 6:
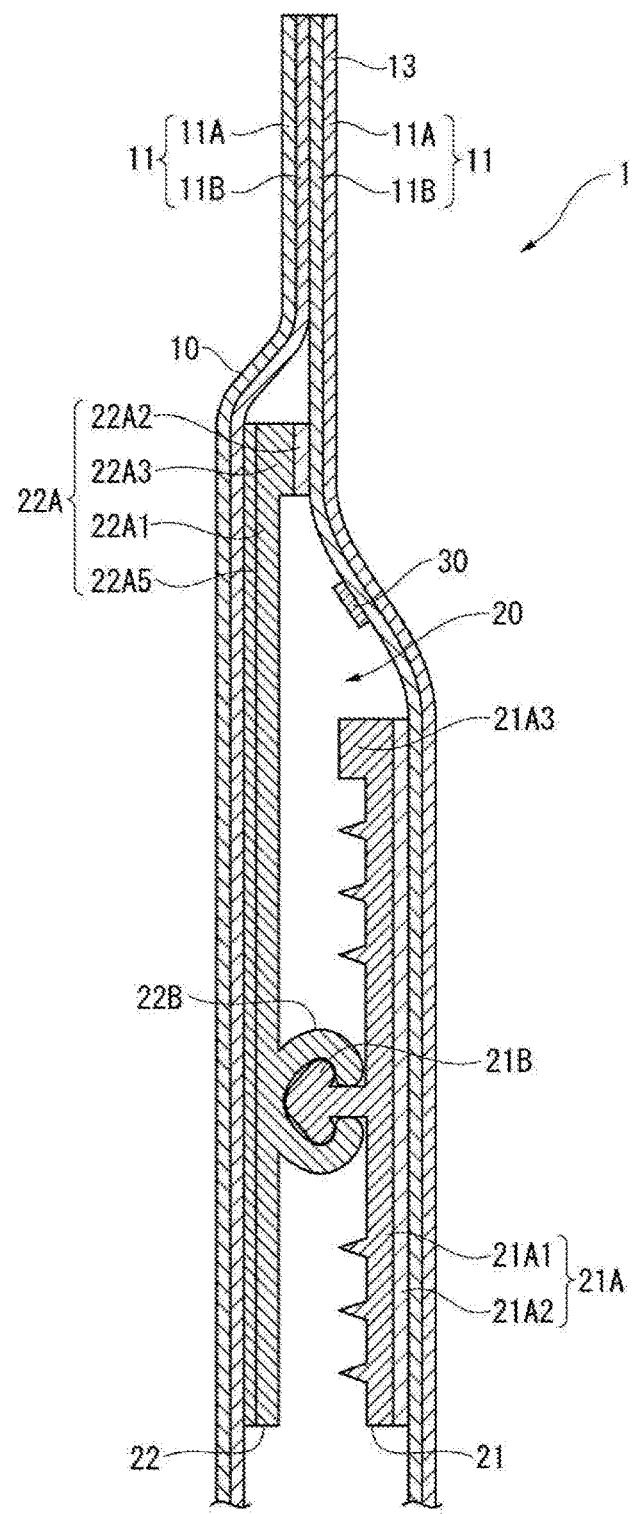
FIG. 6 is a cross-sectional view showing a zipper-tape bag according to still another exemplary embodiment of the invention.

Further, in the second exemplary embodiment, the surface of the female belt-shaped base 22A opposite to the surface where the female portion 22B projects may be provided with a female bonding layer 22A5, which is a third layer to be bonded to the inner surface of the bag body 10, as shown in, for instance, FIG. 6. Such a zipper-tape bag 1, which includes the top seal 13 having been provided to an upper portion of the bag body 10, may be closed by forming a bottom seal (not shown) after a content is put in through the downwardly opened input opening 16.

Further, it is not necessary that the female seal layer 22A2 is layered on the female thickened area 22A3, but the female seal layer 22A2 may be directly layered on an end of the female belt-shaped base 22A without providing a thickened portion.

Figure 7:
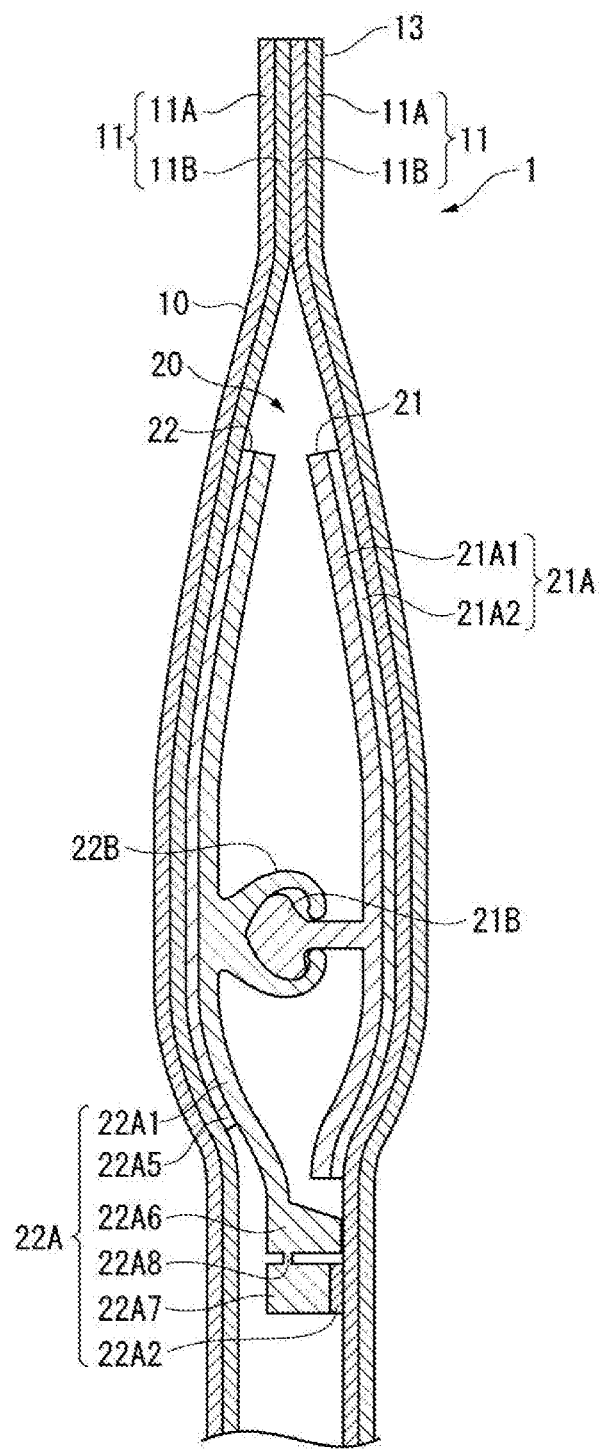
FIG. 7 is a cross-sectional view showing a zipper-tape bag according to yet another exemplary embodiment of the invention.

Further, when one of the male belt-shaped base 21A and the female belt-shaped base 22A is widened, the zipper-tape bag 1 may be opened without using the separation ridge 30. For instance, as shown in FIG. 7, the widened base may have an elongated end that is bonded to the inner surface of the bag body 10 near the containing space 14 in order to improve the sealing performance against an inner pressure.

Figure 8:
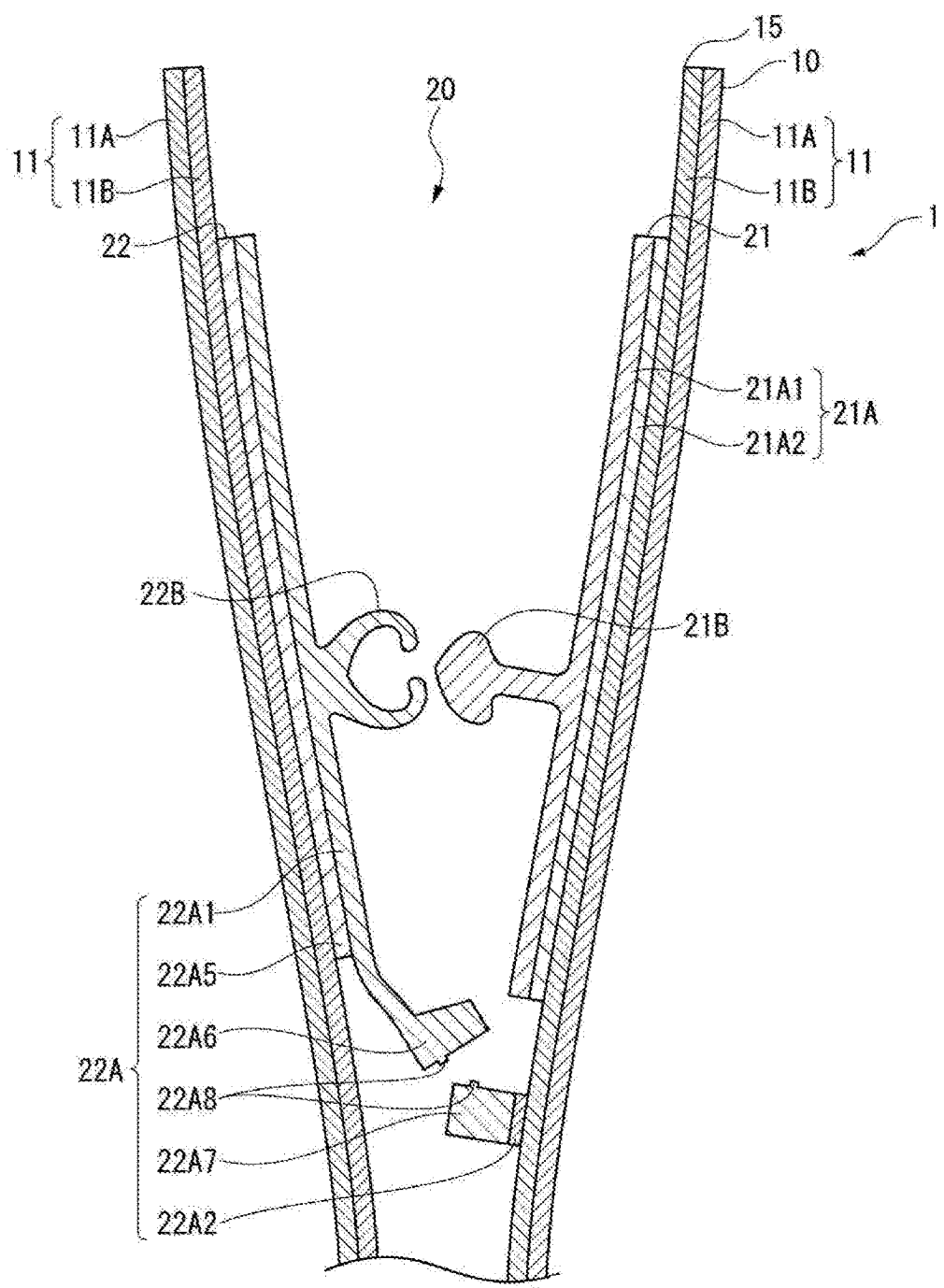
FIG. 8 is a cross-sectional view showing that the zipper-tape bag is opened.

As shown in FIG. 8, such a zipper-tape bag 1 is opened by: cutting off the top seal 13 to form an opening 15; widely opening an opening edge to disengage the male portion 21B and the female portion 22B from each other; and cutting a female thinned area 22A8, which is thinner than the female belt-shaped base 22A, connecting a first female thickened area 22A6 and a second female thickened area 22A7.

Figure 9:
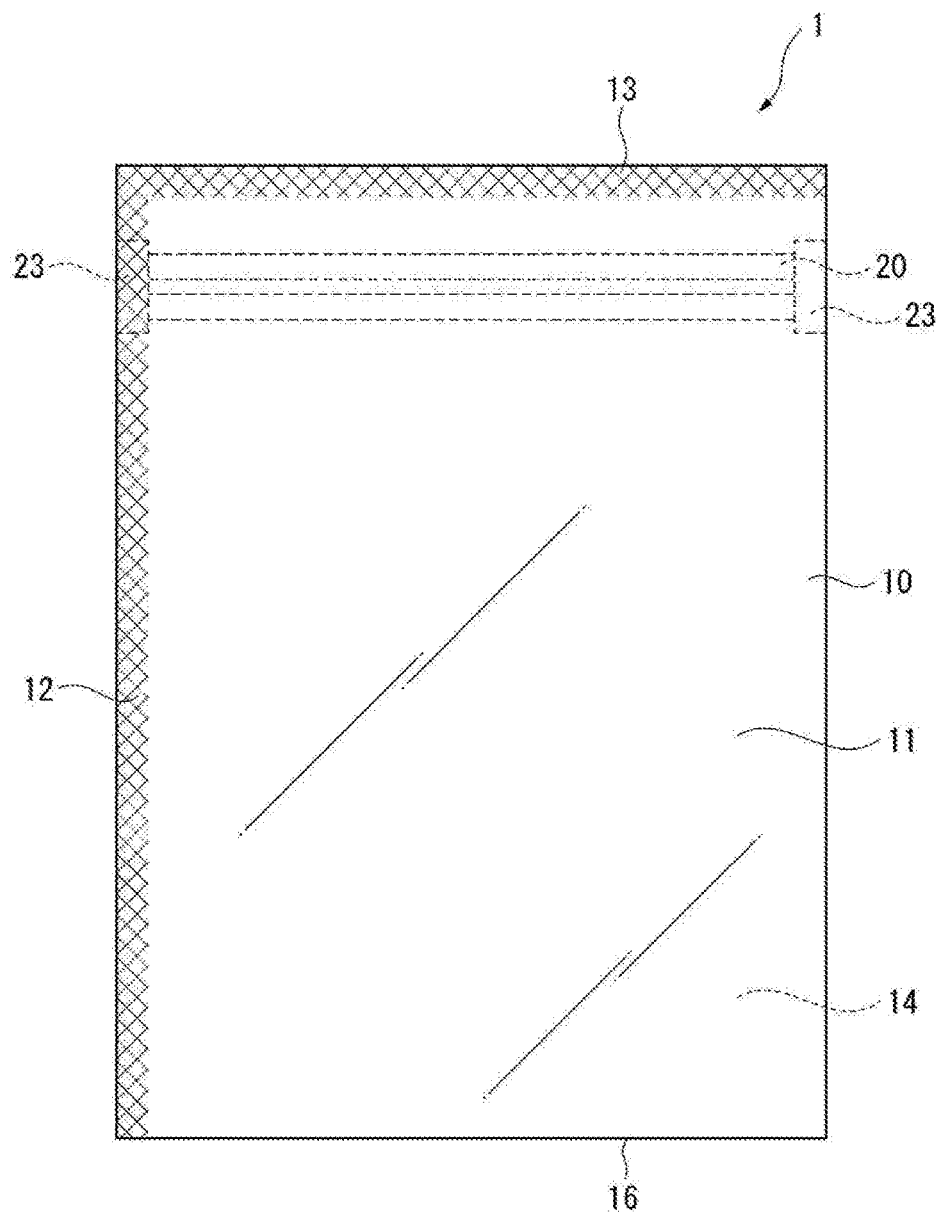
FIG. 9 is a plan showing a zipper-tape bag according to a further exemplary embodiment of the invention.

The pair of side seals 12, which are exemplarily provided to the bag body 10, are not exhaustive. For instance, as shown in FIG. 9, the top seal 13 and the single side seal 12 may be provided to doubled peripheries of the folded base film 11, and the zipper-tape bag 1 may be closed by forming a bottom seal (not shown) after a content is put in through the lower input opening 16. Such an arrangement shown in FIG. 9 preferably further includes the crushed portion 23 provided to an end of the zipper tape 20 opposite to the side seal 12 in order to improve the sealing performance.

The zipper tape 20 may include not one pair but plural pairs of male portions 21B and female portions 22B.

The crushing process is not essential to form the side seal 12. For instance, the side seal 12 may be formed without performing the crushing process, or formed by crushing or cutting at least one of the male portion 21B or the female portion 22B at a position corresponding to each of the side seal(s) 12 in advance and bonding the zipper tape 20 to the base film 11.

EXAMPLE(S)

Next, the invention will be described in further detail with reference to Example(s) and Comparative(s).

It should be noted that the scope of the invention is not limited by the contents of the Example(s) and Comparative(s).

Example 1

The base film 11 of the zipper-tape bag 1 of the first exemplary embodiment shown in FIGS. 1 to 3 was made of an OPP (20 μm)/CPP film (30 μm) using CPP film RS-503C (product name) manufactured by Idemitsu Unitech, Co., Ltd as the sealant layer 11B.

Further, the male base layer 21A1 and the female base layer 22A1 of the zipper tape 20 were made of linear low-density polyethylene with a density of 916 kg/m$^3$, a melting point of 120 degrees C. and MFR of 6.0 g/10 mins. The male seal layer 21A2 and the female seal layer 22A2 were made of a mixture of 80 mass % of a metallocene linear low-density polyethylene with a melting point of a 95 degrees C. and MFR of 4.0 g/10 mins and 20 mass % of a propylene-butene-1 copolymer with a melting point of 110 degrees C.

Bags were made using a three-sided-bag making machine manufactured by TOTANI CORPORATION while changing a temperature of a jig for forming the crushed portion 23 to 180 degrees C., 190 degrees C., 200 degrees C., 210 degrees C. and 220 degrees C.

Evaluation

A pinhole-checker solution put in each of the bags was checked, after being left under the conditions of 24 hrs, 23 degrees C. and 50%, to see if the pinhole-checker solution leaked. The results are shown in FIG. 1.

A: no leakage of the pinhole-checker solution from the crushed portion 23

B: leakage of the pinhole-checker solution from the crushed portion 23

Comparative 1

The zipper-tape bags of Comparative 1, which were made in the same manner as those of Example 1 except that the male base layer 21A1 and the female base layer 22A1 were made of random polypropylene with a density of 900 kg/m$^3$, a melting point of 134 degrees C. and MFR of 7.0 g/10 mins, were checked to see if the pinhole-checker solution leaked. The results are shown in FIG. 1.

TABLE 1

|  | Temperature of Jig for Crushing [° C.] | | | | |
| --- | --- | --- | --- | --- | --- |
|  | 180 | 190 | 200 | 210 | 220 |
| Ex. 1 | A | A | A | A | A |
| Comp. 1 | B | B | B | A | A |

The results shown in Table 1 prove that Comparative 1 requires formation of the crushed portion 23 at a temperature of 210 degrees C. or more in order to achieve a sealing performance sufficient for avoiding leakage from the position of the crushed portion 23 and, contrastively, Example 1 can achieve a sufficient sealing performance even when the crushing process was performed at 180 degrees C.

The invention claimed is:
1. A zipper-tape bag comprising:
a bag body comprising a layered film comprising at least two layers; and
a zipper tape comprising:
a male member comprising: a layered male belt-shaped base comprising at least two layers; and a male portion provided to the male belt-shaped base; and
a female member comprising: a layered female belt-shaped base comprising at least two layers; and a female portion provided to the female belt-shaped base and engageable with the male portion, the male belt-shaped base of the male member and the female belt-shaped base of the female member being bonded to an inner surface of the bag body, wherein the at least two layers of the film comprise a layer exposed on the inner surface of the bag body and made of a resin comprising polypropylene at 50 mass % or more with respect to the other resin component, the male belt-shaped base and the female belt-shaped base each have a surface bonded to the inner surface of the bag body, the at least two layers of each of the male belt-shaped base and the female belt-shaped base comprise a first layer exposed on the bonded surface and made of a resin comprising polyethylene at 50 mass % or more with respect to the other resin component, the at least two layers of the male belt-shaped base further comprise a layer continuous with the male portion, the at least two layers of the female belt-shaped base further comprise a second layer continuous with the female portion, the second layer of each of the male belt-shaped base and the female belt-shaped base is made of linear low-density polyethylene, and a density of the linear low-density polyethylene ranges from 905 kg/m$^3$ to 925 kg/m$^3$.

2. A zipper-tape bag comprising:

a bag body comprising a layered film comprising at least two layers; and a zipper tape comprising:

a male member comprising: a layered male belt-shaped base comprising at least two layers; and a male portion provided to the male belt-shaped base; and a female member comprising: a layered female belt-shaped base comprising at least two layers; and a female portion provided to the female belt-shaped base and engageable with the male portion, one of the male belt-shaped base and the female belt-shaped base being elongated toward a side in a width direction to have a width longer than a width of the other of the male belt-shaped base and the female belt-shaped base when the male portion and the female portion are engaged with each other, wherein the other of the male belt-shaped base and the female belt-shaped base, which is not elongated, has a first surface provided with the male portion or the female portion and a second surface opposite to the first surface and bonded to an inner surface of the bag body, and the elongated one of the male belt-shaped base and the female belt-shaped base has an elongated area having a surface bonded to the inner surface of the bag body at a side where the male portion or the female portion projects, the at least two layers of the film comprise a layer exposed on the inner surface of the bag body and made of a resin comprising polypropylene at 50 mass % or more with respect to the other resin component, the at least two layers of the other of the male belt-shaped base and the female belt-shaped base, which is not elongated, comprise a first layer exposed on the second surface, the at least two layers of the elongated one of the male belt-shaped base and the female belt-shaped base comprise a first layer exposed on the surface of the elongated area at the side where the male portion or the female portion projects, the first layer of each of the male belt-shaped base and the female belt-shaped base is made of a resin comprising polyethylene at 50 mass% or more with respect to the other resin component, the at least two layers of the male belt-shaped base further comprise a layer continuous with the male portion, the at least two layers of the female belt-shaped base further comprise a second layer continuous with the female portion, the second layer of each of the male belt-shaped base and the female belt-shaped base is made of linear low-density polyethylene, and a density of the linear low-density polyethylene ranges from 905 kg/m$^3$ to 925 kg/m$^3$.

3. The zipper-tape bag according to claim 2, wherein the at least two layers of the elongated one of the male belt-shaped base and the female belt-shaped base further comprise a third layer provided to the second surface, the third layer being made of a resin comprising polyethylene at 50 mass % or more with respect to the other resin component.

4. The zipper-tape bag according to claim 1, wherein the density of the linear low-density polyethylene ranges from 910 kg/m$^3$ to 925 kg/m$^3$.

5. The zipper-tape bag according to claim 1, wherein the bag body is formed into a bag-shape by folding a single sheet of the film and bonding a doubled periphery of the film, and the periphery of the bag body is provided with a bonding portion where the film is bonded to itself with a longitudinal end of the zipper tape being sandwiched in the film.

6. The zipper-tape bag according to claim 1, wherein the bag body is formed into a bag-shape by laying at least two sheets of the film on each other and bonding a doubled periphery of the film, and the periphery of the bag body is provided with a pair of bonding portions where the sheets of the film are bonded to each other with a longitudinal end of the zipper tape being sandwiched therebetween.

7. A manufacturing method of a zipper-tape bag, the zipper-tape bag comprising:

a bag body comprising a layered film comprising at least two layers; and a zipper tape comprising:

a male member comprising: a layered male belt-shaped base comprising at least two layers; and a male portion provided to the male belt-shaped base; and a female member comprising: a layered female belt-shaped base comprising at least two layers; and a female portion provided to the female belt-shaped base and engageable with the male portion, the male belt-shaped base of the male member and the female belt-shaped base of the female member being bonded to an inner surface of the bag body, wherein the at least two layers of the film comprise a layer exposed on the inner surface of the bag body and made of a resin comprising polypropylene at 50 mass % or more with respect to the other resin component, the male belt-shaped base and the female belt-shaped base each have a surface bonded to the inner surface of the bag body, the at least two layers of each of the male belt-shaped base and the female belt-shaped base comprise a first layer exposed on the bonded surface and made of a resin comprising polyethylene at 50 mass % or more with respect to the other resin component, the at least two layers of the male belt-shaped base further comprise a layer continuous with the male portion, the at least two layers of the female belt-shaped base further comprise a second layer continuous with the female portion, the second layer of each of the male belt-shaped base and the female belt-shaped base being made of linear low-density polyethylene, and a density of the linear low-density polyethylene ranges from 905 kg/m$^3$ to 925 kg/m$^3$, the method comprising:

bonding the male belt-shaped base and the female belt-shaped base to the film; and forming the film into a bag-shape by bonding a periphery of the film where the male belt-shaped base and the female belt-shaped base are bonded.

8. A manufacturing method of a zipper-tape bag, the zipper-tape bag comprising:

a bag body comprising a layered film comprising at least two layers; and a zipper tape comprising:

a male member comprising: a layered male belt-shaped base comprising at least two layers; and a male portion provided to the male belt-shaped base; and a female member comprising: a layered female belt-shaped base comprising at least two layers; and a female portion provided to the female belt-shaped base and engageable with the male portion, one of the male belt-shaped base and the female belt-shaped base being elongated toward a side in a width direction to have a width longer than a width of the other of the male belt-shaped base and the female belt-shaped base when the male portion and the female portion are engaged with each other, wherein the other of the male belt-shaped base and the female belt-shaped base, which is not elongated, has a first surface provided with the male portion or the female portion and a second surface opposite to the first surface and bonded to an inner surface of the bag body, and the elongated one of the male belt-shaped base and the female belt-shaped base has an elongated area having a surface bonded to the inner surface of the bag body at a side where the male portion or the female portion projects, the at least two layers of the film comprise a layer exposed on the inner surface of the bag body and made of a resin comprising polypropylene at 50 mass % or more with respect to the other resin component, the at least two layers of the other of the male belt-shaped base and the female belt-shaped base, which is not elongated, comprise a first layer exposed on the second surface, the at least two layers of the elongated one of the male belt-shaped base and the female belt-shaped base comprise a first layer exposed on the surface of the elongated area at a side where the male portion or the female portion projects, the first layer of each of the male belt-shaped base and the female belt-shaped base is made of a resin comprising polyethylene at 50 mass % or more with respect to the other resin component, the at least two layers of the male belt-shaped base further comprise a layer continuous with the male portion, the at least two layers of the female belt-shaped base further comprise a second layer continuous with the female portion, the second layer of each of the male belt-shaped base and the female belt-shaped base is made of linear low-density polyethylene, and a density of the linear low-density polyethylene ranges from 905 kg/m$^3$ to 925 kg/m$^3$, the method comprising:

bonding the male belt-shaped base and the female belt-shaped base to the film; and forming the film into a bag-shape by bonding a periphery of the film where the male belt-shaped base and the female belt-shaped base are bonded.

9. The manufacturing method of the zipper-tape bag according to claim 8, wherein the at least two layers of the elongated one of the male belt-shaped base and the female belt-shaped base further comprise a third layer provided to the second surface, the third layer being made of a resin comprising polyethylene at 50 mass % or more with respect to the other resin component.

10. The manufacturing method of the zipper-tape bag according to claim 7, wherein the density of the linear low-density polyethylene ranges from 910 kg/m$^3$ to 925 kg/m$^3$.

11. The manufacturing method of the zipper-tape bag according to claim 7, wherein the formation of the film into the bag-shape comprises folding a single sheet of the film, and bonding a doubled periphery of the film with a longitudinal end of the zipper tape being sandwiched in the film.

12. The manufacturing method of the zipper-tape bag according to claim 7, wherein the formation of the film into the bag-shape comprises laying at least two sheets of the film on each other, bonding a doubled periphery of the film, and forming a pair of bonding portions where the sheets of the film are bonded to each other with a longitudinal end of the zipper tape being sandwiched therebetween.

13. The zipper-tape bag according to claim 2, wherein the density of the linear low-density polyethylene ranges from 910 kg/m$^3$ to 925 kg/m$^3$.

14. The zipper-tape bag according to claim 2, wherein the bag body is formed into a bag-shape by folding a single sheet of the film and bonding a doubled periphery of the film, and the periphery of the bag body is provided with a bonding portion where the film is bonded to itself with a longitudinal end of the zipper tape being sandwiched in the film.

15. The zipper-tape bag according to claim 2, wherein the bag body is formed into a bag-shape by laying at least two sheets of the film on each other and bonding a doubled periphery of the film, and the periphery of the bag body is provided with a pair of bonding portions where the sheets of the film are bonded to each other with a longitudinal end of the zipper tape being sandwiched therebetween.

16. The manufacturing method of the zipper-tape bag according to claim 8, wherein the density of the linear low-density polyethylene ranges from 910 kg/m$^3$ to 925 kg/m$^3$.

17. The manufacturing method of the zipper-tape bag according to claim 8, wherein the formation of the film into the bag-shape comprises folding a single sheet of the film, and bonding a doubled periphery of the film with a longitudinal end of the zipper tape being sandwiched in the film.

18. The manufacturing method of the zipper-tape bag according to claim 8, wherein the formation of the film into the bag-shape comprises laying at least two sheets of the film on each other, bonding a doubled periphery of the film, and forming a pair of bonding portions where the sheets of the film are bonded to each other with a longitudinal end of the zipper tape being sandwiched therebetween.

19. The zipper-tape bag according to claim 1, wherein the first layer consists of polyethylene at 50 mass % or more and a resin component comprising polypropylene or polybutene-1.

20. The zipper-tape bag according to claim 19, wherein the first layer comprises polyethylene at 90 mass % or less with respect to the other resin component.

21. The zipper-tape bag according to claim 1, wherein the layer of the film exposed on the inner surface of the bag body consists of polypropylene at 50 mass % or more and less than 100 mass % and a resin component comprising linear low-density polyethylene (LLDPE), low-density polyethylene, or polybutene.

* * * * *